No. 629,269. Patented July 18, 1899.
S. H. PILLAR.
SPRAYING APPARATUS.
(Application filed Dec. 20, 1898.)
(No Model.)
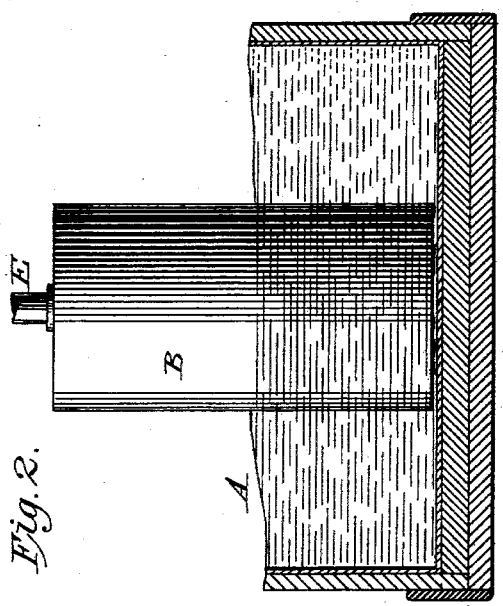
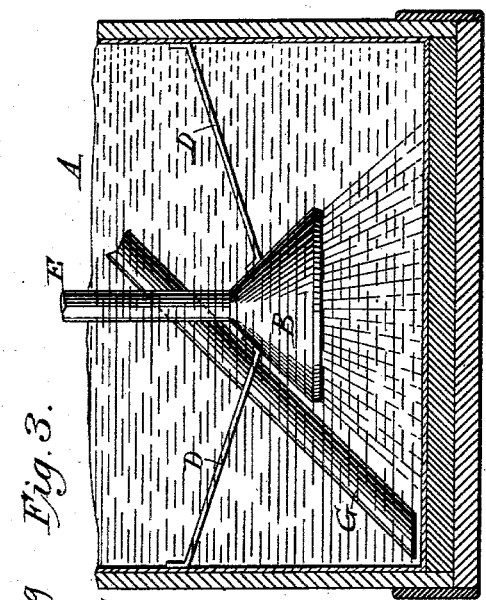
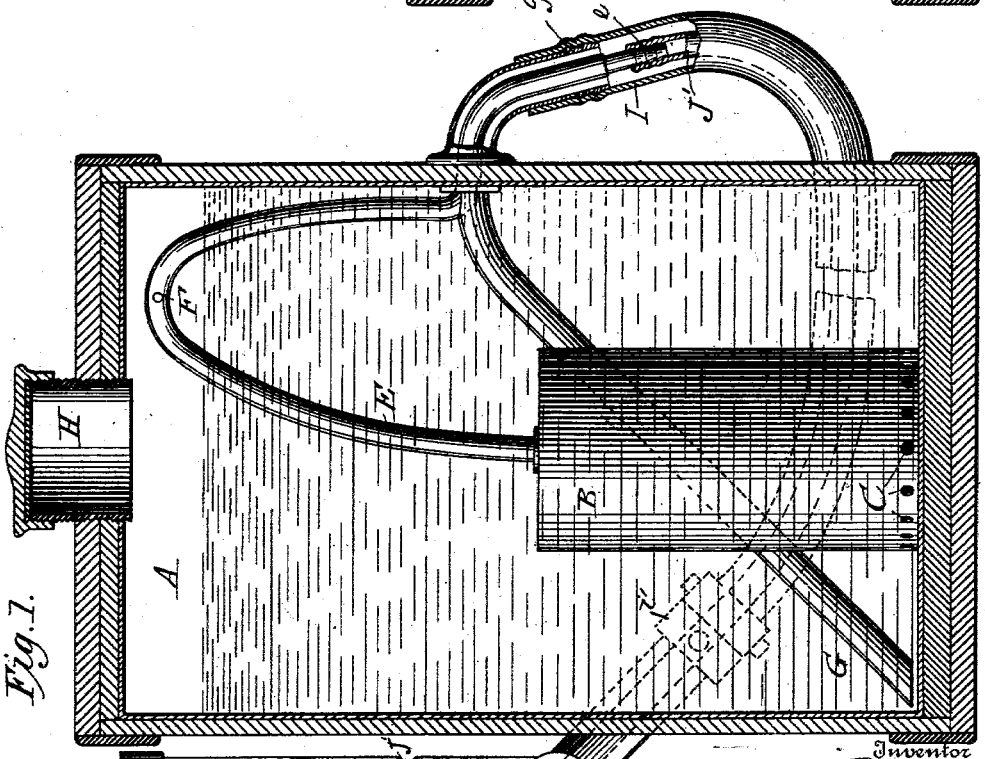

UNITED STATES PATENT OFFICE.

SAMUEL HUDSON PILLAR, OF DUBLIN, IRELAND.

SPRAYING APPARATUS.

SPECIFICATION forming part of Letters Patent No. 629,269, dated July 18, 1899.

Application filed December 20, 1898. Serial No. 699,842. (No model.)

*To all whom it may concern:*

Be it known that I, SAMUEL HUDSON PILLAR, a subject of the Queen of Great Britain, residing in Dublin, in the county of Dublin, Ireland, have invented certain new and useful Improvements in Spraying Apparatus, of which the following is a specification.

My invention relates to apparatus for spraying plants, and has for its objects to produce a device of this character in which a tidal motion of the contents of the apparatus will be constantly maintained throughout the operation of the device, thus insuring a thorough mixing of the liquid used and preventing any accumulation of sediment in the bottom of the tank.

To these ends the invention consists in providing the sprayer tank or reservoir with an agitating vessel or chamber which on one stroke of the operating-pump becomes filled with the liquid and on the reverse stroke of the pump has this liquid forced from it through a suitable opening or openings by air under pressure across the bottom of the sprayer-tank.

The invention further consists in the details of construction hereinafter described.

In the accompanying drawings, Figure 1 is a central vertical section through the sprayer-tank, the agitating vessel and other parts being shown in elevation. Figs. 2 and 3 are similar views of modifications.

Referring to the drawings, A indicates the sprayer tank or reservoir, which contains the liquid to be ejected onto the plants.

B is an agitating vessel or chamber which, as shown in Fig. 1, is situated at the center and rests upon the bottom of the tank A. This agitating vessel is provided near its bottom with a series of perforations C, formed at intervals entirely around the vessel B for the purpose hereinafter explained. An air-pipe E is attached to the upper end of the agitating vessel, whence it extends upward to a point above the level of the liquid contained in the sprayer-tank, at which point it is provided with a small vent-opening F for the purpose hereinafter specified, and thence downward and outward through the side of the tank, where it terminates in nozzle e.

G is the discharge-pipe on the interior of the sprayer-tank and which extends from a point at or near the bottom of the tank upward and outward through the side of the tank around the air-pipe E and terminates on the exterior of said tank in a nozzle g, which surrounds the nozzle e of the air-pipe E.

I is a flexible pipe attached at one end to the nozzle g of the discharge-pipe G and at its opposite end to the spraying-nozzle I' and serves to convey the liquid discharged from tank A to the spraying-nozzle I', by which it is sprayed upon the plants.

i is a discharge cock or valve for regulating the discharge of the liquid.

i' is the coupling between the spraying-nozzle and pipe I.

J is an air-pump located at the side of the spraying-nozzle I', to which it is attached in any appropriate manner.

J' is an air-pipe on the interior of the pipe I, attached at one end to the nozzle e and extending through the pipe I and spraying-nozzle I' to a point near the discharge end of the latter, at which point it passes out through the side wall of the latter and connects with the air-pump J.

The operation of the device is as follows: The tank A having been charged through the opening H in its top, the liquid in the tank will enter the agitating vessel B through the apertures C and fill or nearly fill said vessel, the air escaping from the vessel through pipe E and the small vent-opening F. Now when the pump is operated air will upon the instroke of the pump-piston be forced through the pipe J' and pipe E, with which it connects, into the agitating vessel B, forcibly expelling the liquid therefrom out through the apertures C across the bottom of the tank A. By this operation a portion of the liquid contents of the tank A will be forced out through the discharge-pipe G and pipe I, with which it connects, to the spraying-nozzle I', through which it will be sprayed upon the plants. Upon the reverse or out stroke of the pump-piston the liquid in the tank A will again flow into the vessel B through the apertures C, the air escaping from the vessel, as before, through pipe E and vent-opening F, and upon the piston being again forced in the first-described action is repeated, and so on until the contents of the tank have been discharged. It will be seen from this that during the operation of the device the liquid contents of the sprayer-tank flow alternately into and out of the agitating vessel across the bottom of the tank, thus creating a tidal action which serves to keep the contents of the tank constantly agitated and to effectually prevent the accumulation of sediment on the bottom of the tank.

In the modification shown in Fig. 2 the apertures C are dispensed with, the vessel B instead being slightly elevated above the bottom of the tank A to form a passage of communication between them.

In the modification shown in Fig. 3 the vessel B is shown supported away from the bottom of the tank A by struts D, the vessel B in this instance being provided with a perforated bottom through which it communicates with the tank A. In both of these modifications, however, the operation will be the same as that described in connection with Fig. 1.

Having thus described my invention, what I claim is—

1. In apparatus for spraying plants and for other like purposes in which the liquid to be sprayed is put under pressure by compressed air so that it may be ejected with force from a spraying-nozzle, the combination with the liquid container or tank, of an inner vessel immersed therein, having its interior in communication at its lower end with the liquid near the bottom of the tank and at its upper end with the air-space above the level of liquid in the tank, means for supplying an intermittent air-pressure to said vessel to alternately force the liquid therein down and then allow it to rise again therein as the air-pressure above escapes into the air-space in the tank, and an outlet-pipe for delivering the liquid to the spraying-nozzle, substantially as described.

2. In apparatus for spraying plants and for other like purposes in which the liquid to be sprayed is put under pressure by compressed air so that it may be ejected with force from a spraying-nozzle, the combination with the liquid container or tank, of an inner vessel immersed therein having its interior in communication at its lower end with the liquid near the bottom of the tank, and its upper end closed to the liquid in the tank, a pipe leading from the upper end of said vessel to the exterior of the tank and having an upward bend reaching above the level of the liquid in the tank and an air-escape opening in said bend communicating with the air-space in the tank, means for supplying an intermittent air-pressure to said pipe, and an outlet-pipe for delivering the liquid to the spraying-nozzle, substantially as described.

3. In a spraying apparatus, the combination with a sprayer tank or reservoir, of a spraying-nozzle, a discharge-pipe leading from said tank to said nozzle, an air-pump situated adjacent to the spraying-nozzle and an air-pipe connected with the air-pump and extending into and through the discharge-pipe and connected with the sprayer-tank, substantially as described.

In witness whereof I have hereunto signed my name, this 5th day of December, 1898, in the presence of two subscribing witnesses.

SAMUEL HUDSON PILLAR.

Witnesses:
   WILLIAM ARTHUR BEALE,
   THOMAS HEWITT.